(12) United States Patent
Tighe et al.

(10) Patent No.: US 10,150,560 B2
(45) Date of Patent: *Dec. 11, 2018

(54) VENTILATED ROTOR MOUNTING BOOM FOR PERSONAL AIRCRAFT

(71) Applicant: Kitty Hawk Corporation, Mountain View, CA (US)

(72) Inventors: James Joseph Tighe, San Jose, CA (US); Geoffrey Alan Long, Montara, CA (US); Uri Tzarnotzky, Sunnyvale, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,126

(22) Filed: Aug. 21, 2017

(65) Prior Publication Data

US 2018/0105268 A1 Apr. 19, 2018

Related U.S. Application Data

(63) Continuation of application No. 15/297,033, filed on Oct. 18, 2016, now Pat. No. 9,764,833.

(51) Int. Cl.
*B64C 29/00* (2006.01)
*B64D 13/00* (2006.01)
*B64D 13/06* (2006.01)

(52) U.S. Cl.
CPC ........ *B64C 29/0025* (2013.01); *B64D 13/006* (2013.01); *B64D 2013/0614* (2013.01)

(58) Field of Classification Search
CPC .......... B64D 13/006; B64D 2013/0614; B64D 2033/0253; B64C 29/0025
See application file for complete search history.

(56) References Cited

U.S. PATENT DOCUMENTS

| | | | |
|---|---|---|---|
| 3,824,598 A | 7/1974 | Beaussay | |
| 7,325,772 B1 | 2/2008 | Hanewinkel, III | |
| 8,123,460 B2 | 2/2012 | Collette | |
| 9,415,878 B2 | 8/2016 | Wetzel | |
| 9,764,833 B1* | 9/2017 | Tighe | B64C 29/0025 |
| 2010/0021288 A1 | 1/2010 | Collette | |
| 2016/0297520 A1 | 10/2016 | Sada-Salinas et al. | |
| 2016/0332724 A1 | 11/2016 | Mehring | |
| 2018/0002023 A1* | 1/2018 | Tian | B64D 13/006 |

* cited by examiner

*Primary Examiner* — Joseph W Sanderson
(74) *Attorney, Agent, or Firm* — Van Pelt, Yi & James LLP

(57) ABSTRACT

Described embodiments provide a rotor mounting boom assembly for a personal aircraft. The rotor mounting boom assembly includes a rotor mounting boom releasably attachable to a wing of the personal aircraft, one or more vertical lift rotors, and one or more rotor controller assemblies. Controller assemblies for each rotor are positioned on the rotor mounting booms such that downwash from the rotor causes increased airflow across the controller assembly to cool the controller assembly components. A rotor controller enclosure includes an air inlet and an air outlet to allow airflow through the enclosure to cool the controller components. The air inlet is positioned relative to the path of the rotor blades such that the downwash from the rotor that flows into the air inlet is maximized. The structure of the enclosure includes features for increasing the airflow through the enclosure.

17 Claims, 15 Drawing Sheets

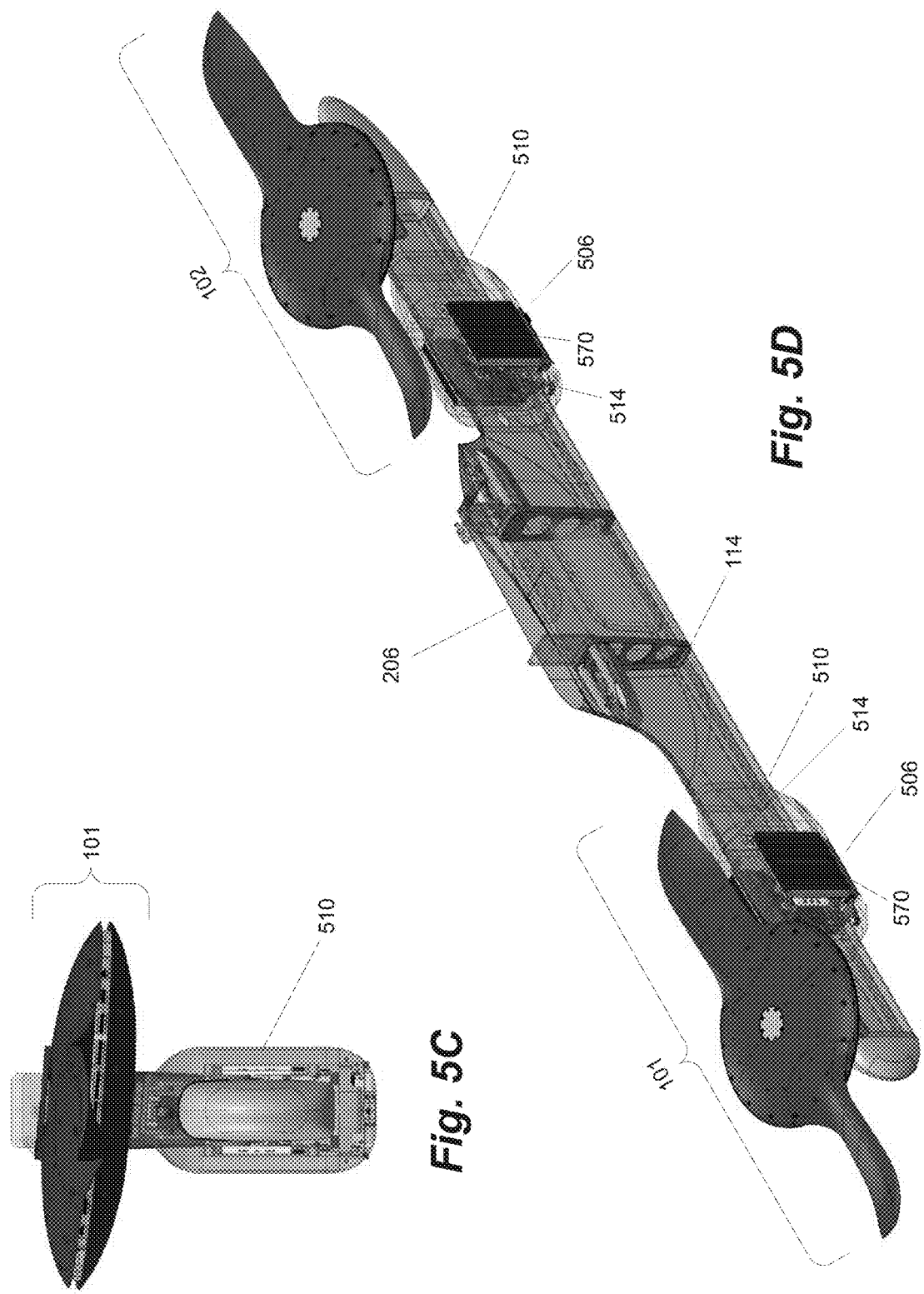

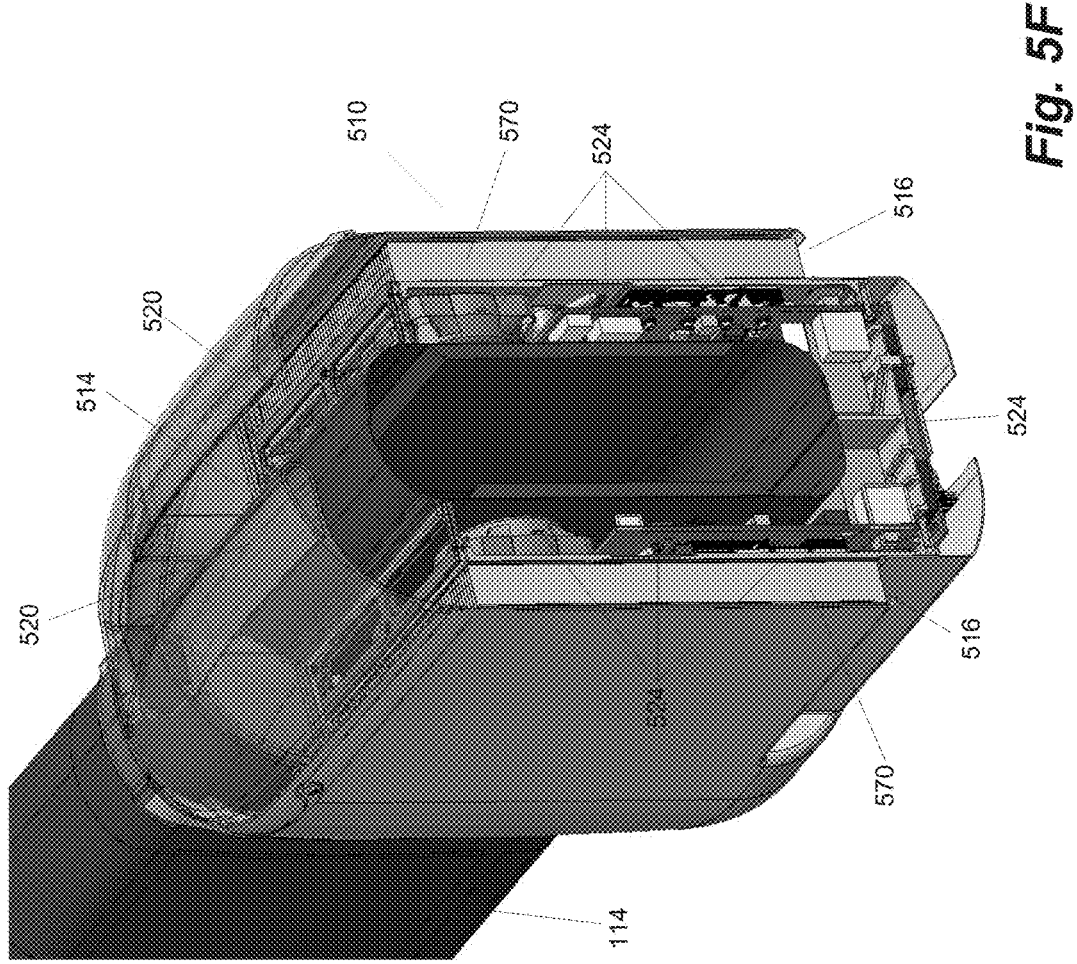

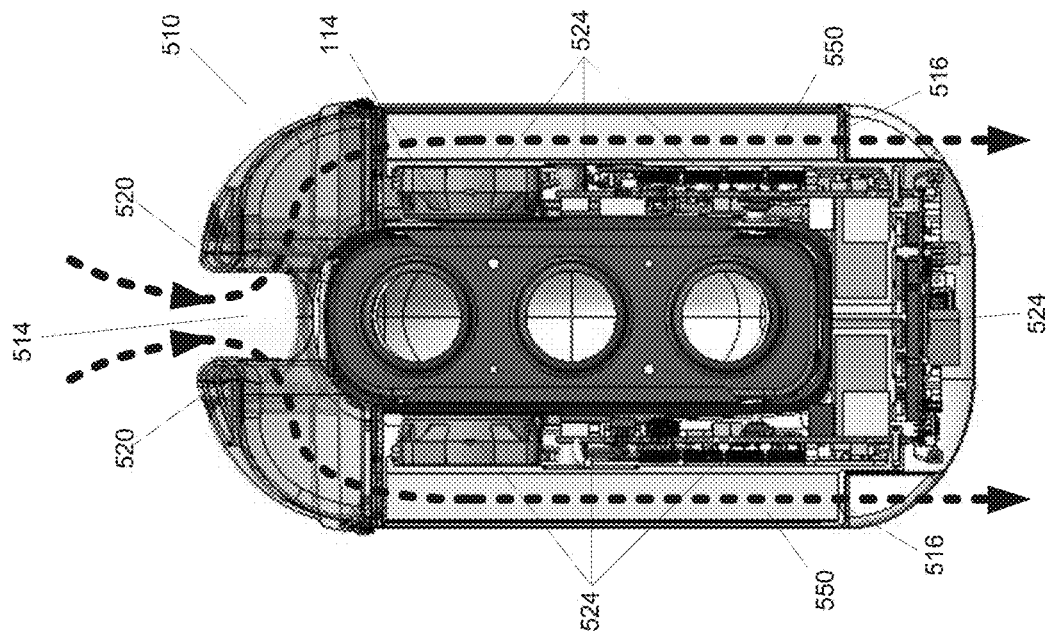
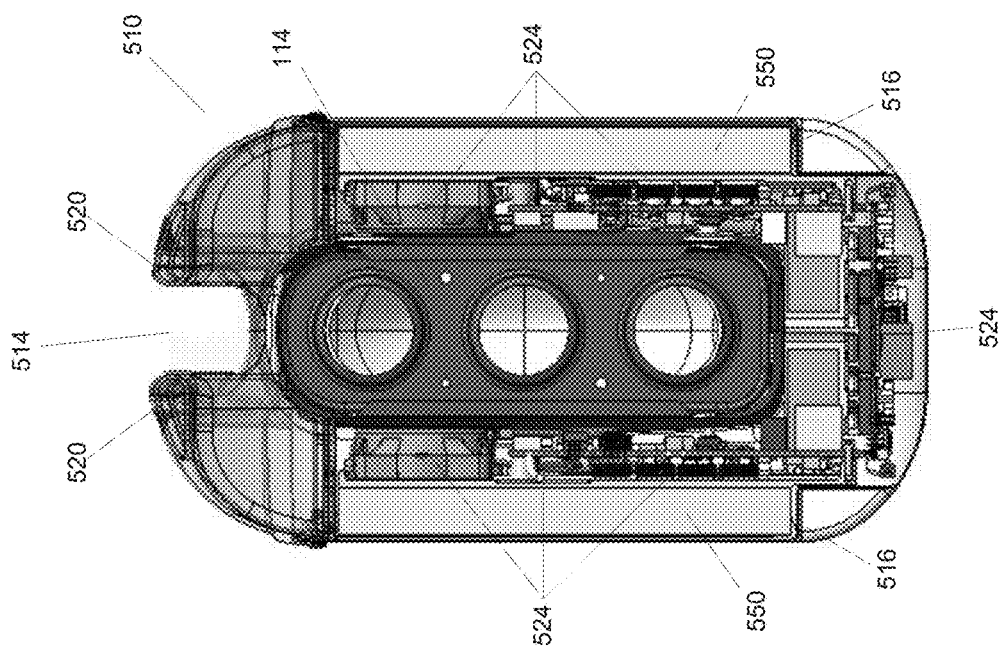

VENTILATED ROTOR MOUNTING BOOM FOR PERSONAL AIRCRAFT

CROSS REFERENCE TO OTHER APPLICATIONS

This application is a continuation of co-pending U.S. patent application Ser. No. 15/297,033, entitled VENTILATED ROTOR MOUNTING BOOM FOR PERSONAL AIRCRAFT filed Oct. 18, 2016 which is incorporated herein by reference for all purposes.

BACKGROUND

Field of the Invention

This disclosure relates generally to a rotor mounting boom for a personal aircraft configured to provide safe operations while achieving robust control and efficient maintenance. In particular, the described embodiments include a rotor mounting boom for an aircraft with vertical takeoff and landing capability. The rotor mounting boom includes a rotor and a controller assembly ventilated by rotor downwash.

Description of Related Art

Taking off and landing vertically, instead of using a runway to develop sufficient velocity on the ground for wings to provide adequate lift, requires an aircraft to provide both vertical and forward thrust. Thrust produced in the vertical direction provides lift to the vehicle; thrust produced horizontally provides forward movement. A vertical takeoff and landing (VTOL) aircraft can produce both vertical and horizontal thrust, and is able to control these forces in a balanced fashion.

The rotary wing aircraft, or helicopter, is one common type of VTOL aircraft. Helicopters have large rotors that provide both vertical and horizontal thrust. For the rotors to perform this dual function across a range of airspeeds, the rotors are typically quite complex. Depending on the vehicle flight condition, the rotor blades must be at different orientation angles around the 360 degrees of azimuth rotation to provide the needed thrust. Therefore, rotors have both collective and cyclic variation of the blade orientation angle. Collective varies the angle of each blade equally, independent of the 360-degree rotation azimuth angle. Cyclic varies the blade angle of attack as a function of the 360-degree rotation azimuth angle. Cyclic control allows the rotor to be tilted in various directions and therefore direct the thrust of the rotor forwards, backwards, left or right. This direction provides control forces to move the helicopter in the horizontal plane and respond to disturbances such as wind gusts.

Helicopter rotors are large and unprotected from hitting nearby obstacles. Additionally, they utilize mechanically complex systems to control both the collective and cyclic blade angles. Such rotors are mechanically complex and require maintenance. The rotors generally rotate at a low speed; this results in heavy transmissions between the rotor and motor. The transmissions, or gearboxes, decrease the vehicle payload potential, as well as vehicle safety. Because of the mechanical complexity across the entire vehicle system, many parts are single points of failure. Because of this lack of redundancy, frequent inspections and maintenance are required to keep the vehicle safe.

Other types of VTOL aircraft have multiple rotors to reduce the single points of failure. However, many vital components, such as motor controllers, are not duplicated, and are thus still single points of failure. These components are not duplicated due to design complexity, weight issues, and maintenance concerns. For example, a motor controller typically needs to be cooled, and including multiple conventional cooling systems on an aircraft increases design complexity and aircraft weight. Additionally, including multiple conventional cooling systems increases the chances that an aircraft will be taken out of service for maintenance.

SUMMARY

Described embodiments provide a rotor mounting boom for a personal aircraft with a configuration that is safe and efficient as well as easy to maintain. In one embodiment, multiple rotor mounting booms are coupled to a wing of the personal aircraft and are removable and replaceable for maintenance. Each rotor mounting boom includes a forward rotor assembly and an aft rotor assembly, which enable the aircraft to accomplish vertical takeoff and landing with transition to and from forward flight. In one embodiment, each rotor mounting boom includes one or more rotor controller assemblies for controlling rotor operation by sending control signals to the rotors. The rotor mounting booms include an attachment interface for attachment to the wings of the personal aircraft. In one embodiment, the attachment interface allows the rotor mounting boom to be attached to the wing using releasable fasteners, such as screws or bolts, so that the rotor mounting boom may be easily removed from the wing for efficient repair or replacement.

In one embodiment, the aircraft configuration includes multiple rotors on multiple rotor mounting booms oriented to provide vertical thrust for lift and control during takeoff, transition to and from forward flight, and landing. The rotors are attached to the rotor mounting booms in fixed, non-planar orientations. The orientations of rotors provide lateral and, in some embodiments, fore and aft control of aircraft without requiring a change of attitude, and minimize disturbances to the flow when the aircraft is cruising. In various embodiments, the rotors have forward, backwards, left, and right orientations, and are located along the leading and trailing edge of the wing, with two or more rotors located on each side of the fuselage. Due to the multiple number and independence of the vertical lift rotors, the vertical thrust is redundant and thrust and control remain available even with the failure of any single rotor. Since there are multiple vertical rotors that provide large control forces, the rotors are smaller, with faster response rates for operation even in gusty wind conditions. In one embodiment, a separate electric motor and controller powers each vertical lift rotor, to provide lift system redundancy from failure of one or more lifting rotors.

Controller assemblies for each rotor are positioned on the rotor mounting booms such that downwash from the rotor causes increased airflow across the controller assembly, which allows for more effective cooling of controller assembly components and more efficient controller operation. In one embodiment, the controller assembly includes an enclosure that houses and protects controller components. The enclosure includes an air inlet and an air outlet to allow airflow through the enclosure to cool the controller components. In one embodiment, a heat exchanger such as a folded fin heat exchanger is included in the controller components to facilitate cooling of the other components using the air flowing through the enclosure. The air inlet is positioned relative to the path of the rotor blades such that the downwash from the rotor that flows into the air inlet is maximized. In one embodiment, the structure of the enclosure includes features for increasing the airflow through the enclosure. For example, the enclosure may include an inlet cowl and a nose cone to direct airflow through the enclosure. Additionally, the enclosure may include a raised portion aft of the air inlet that raises the air pressure around the air inlet to increase airflow into the air inlet.

BRIEF DESCRIPTION OF THE DRAWINGS

FIG. 5C illustrates a front view of a rotor mounting boom in accordance with one embodiment.

FIG. 5D illustrates a perspective view of a rotor mounting boom in accordance with one embodiment.

FIG. 5F illustrates a cross-section perspective view of an example enclosure for a rotor controller assembly in accordance with one embodiment.

FIG. 5G illustrates a cross-section view of an example enclosure for a rotor controller assembly in accordance with one embodiment.

FIG. 5H illustrates the cross-section view of the example enclosure of FIG. 5G with dashed arrows indicating the airflow through the enclosure.

DETAILED DESCRIPTION

Figure 1:
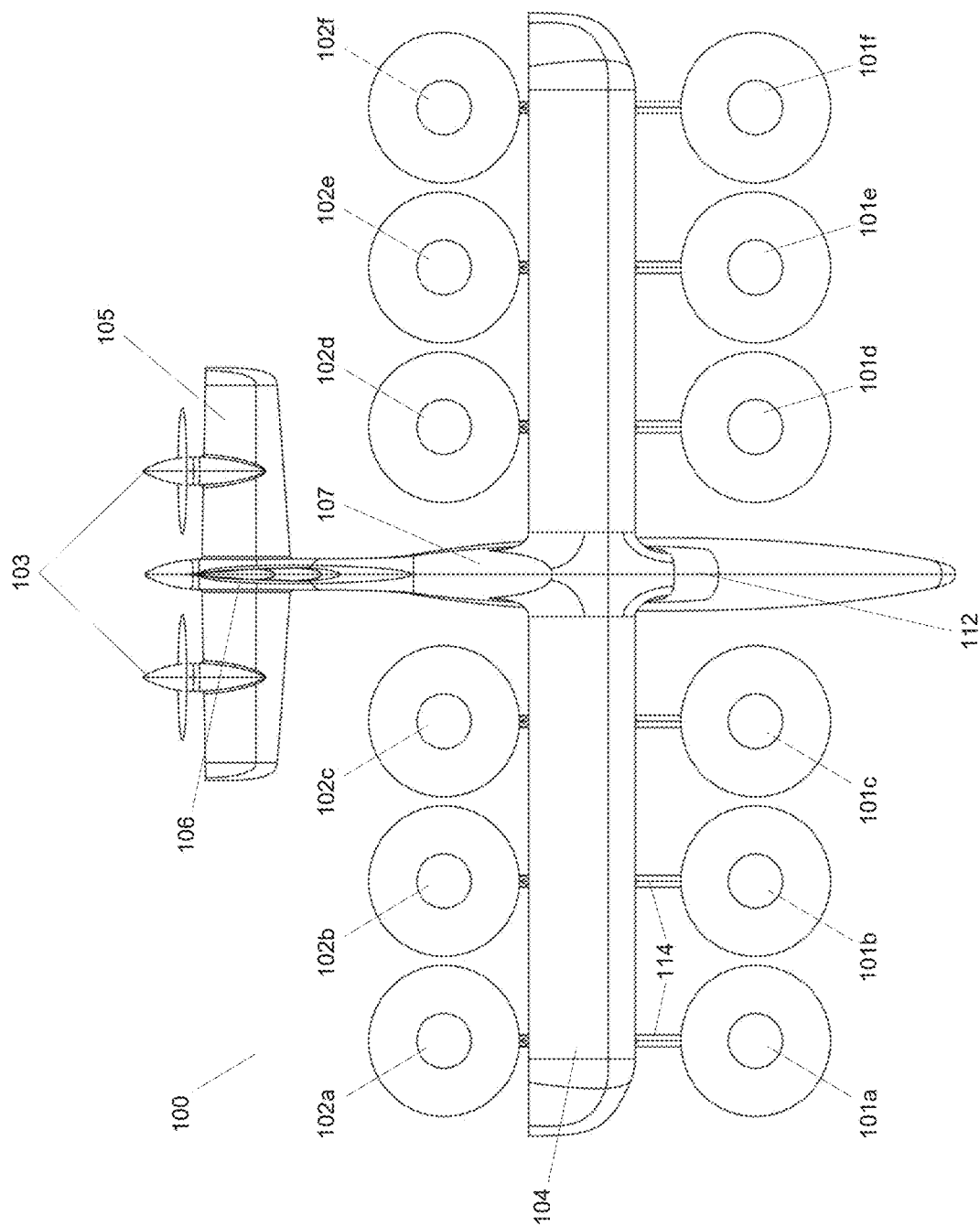
FIG. 1 is a top view of a personal aircraft vehicle in accordance with one embodiment.
Figure 2:
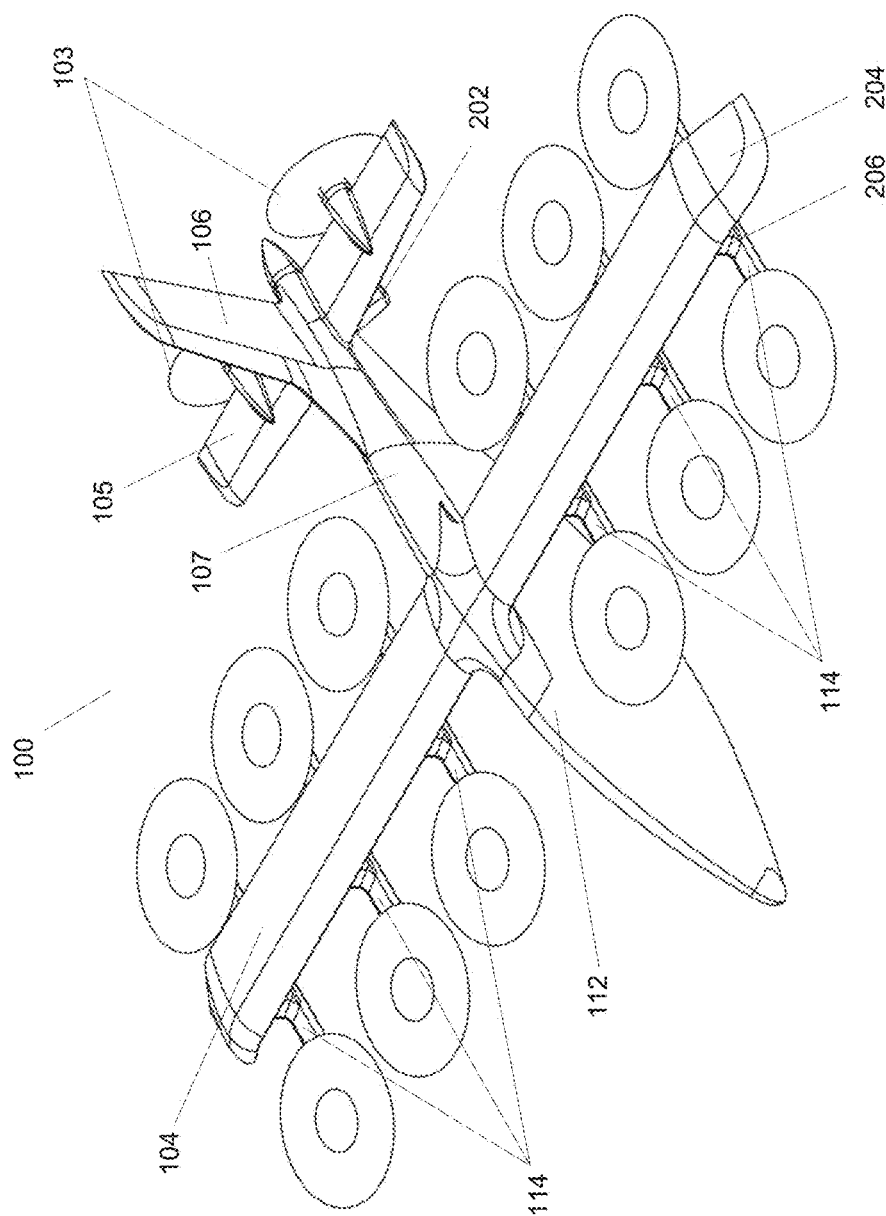
FIG. 2 illustrates a perspective view of a personal aircraft vehicle in accordance with one embodiment.
Figure 3:
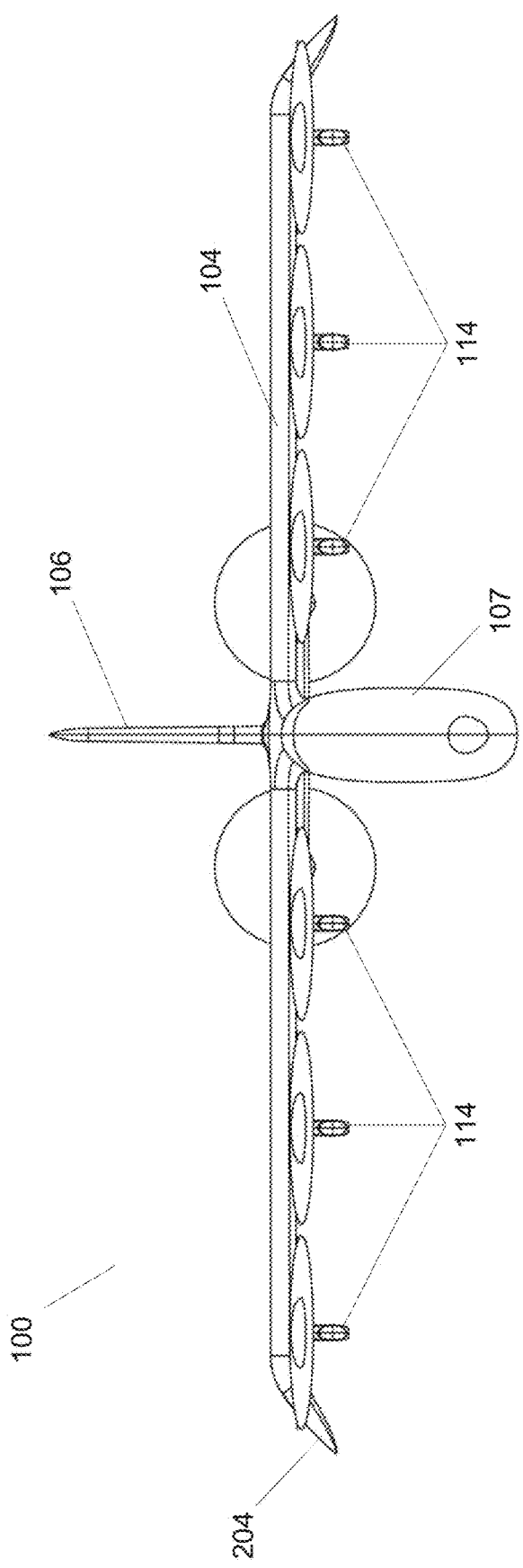
FIG. 3 illustrates a front view of a personal aircraft vehicle in accordance with one embodiment.
Figure 4:
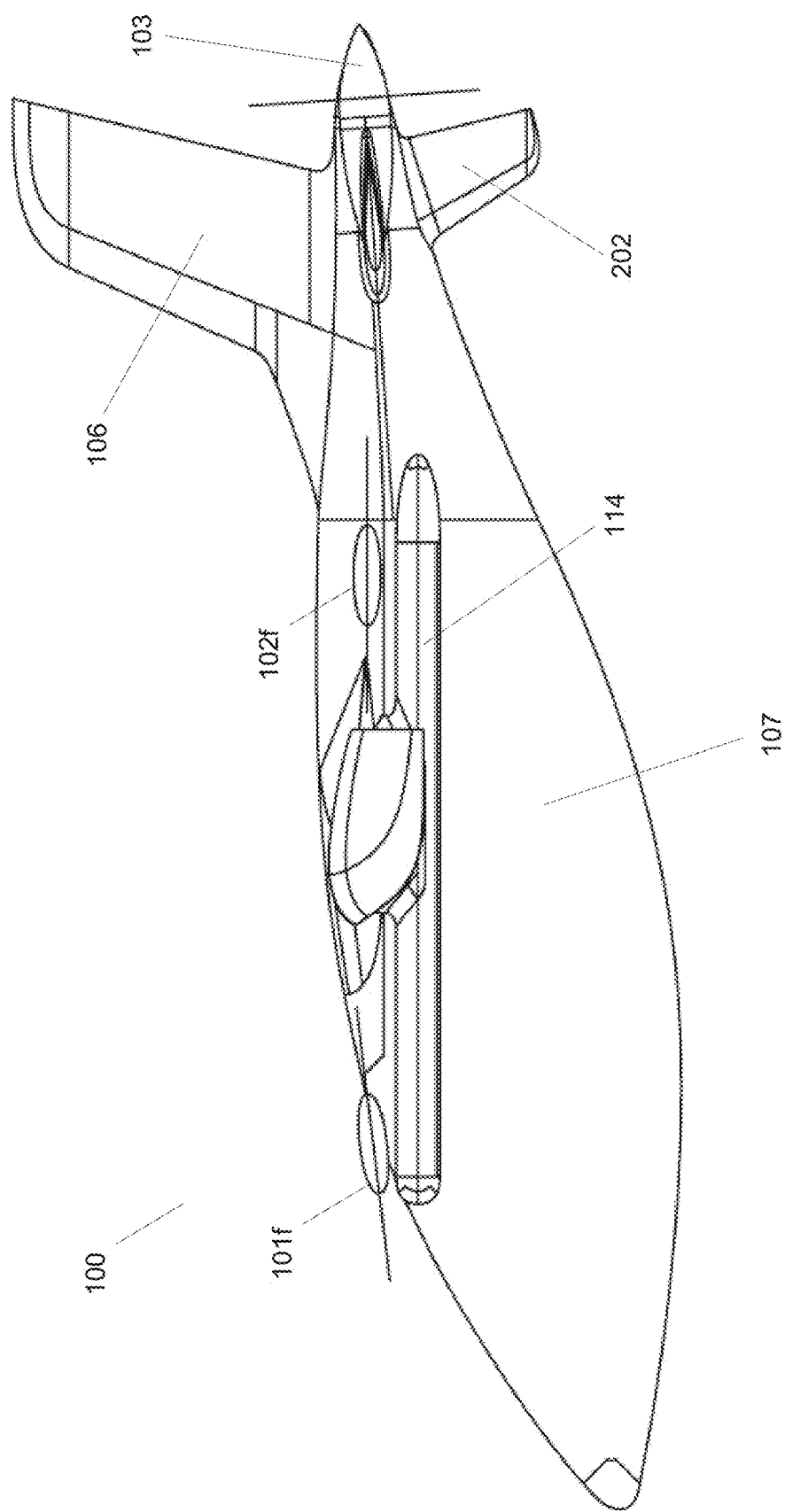
FIG. 4 illustrates a view of the left (port) side of a personal aircraft vehicle in accordance with one embodiment.

FIG. 1 illustrates a personal aircraft 100 in accordance with one embodiment. Aircraft 100 includes forward vertical lift rotor assemblies 101a-f (generally, 101) with fixed orientations; aft vertical lift rotor assemblies 102a-f (generally, 102); forward flight propellers 103; a wing 104; a horizontal stabilizer 105; a vertical stabilizer 106; rotor mounting booms 114; a cockpit area 112 and a fuselage 107. Fuselage 107 also includes landing gear, a flight computer and power source (not shown), each of which is described further below. FIG. 2 illustrates a perspective view of personal aircraft 100, including a ventral fin 202, downward-angled wingtips 204, and boom attachment interface 206. FIG. 3 illustrates a front view of personal aircraft 100. FIG. 4 illustrates a view of the left (port) side of aircraft 100 in accordance with one embodiment.

In various embodiments, aircraft 100 is sized to accommodate a single pilot and personal cargo. For example, in various embodiments the length of the aircraft from nose to its aft-most surface is between 15 and 20 feet, and its wingspan is between 15 and 20 feet. In alternative embodiments, the aircraft may be longer or shorter, wider or narrower, as will be appreciated by those of skill in the art, without departing from the principles described here.

Aircraft 100 is constructed in various embodiments primarily of a composite material. Fuselage 107 and wing 104 are made from carbon fiber composite material. In alternative embodiments, the wing may have metal fittings and ribs attached to the inside and outside of a carbon fiber composite wing skin. In some embodiments the wing skin may comprise composite materials made of carbon fiber combined with other composite materials such as Kevlar. In other alternative embodiments, the fuselage may comprise a metal truss made from steel or aluminum with a composite skin that covers the truss. The composite fuselage skin in this embodiment may be made of carbon fiber, Kevlar, or other composite materials as understood by those of skill in the art. The cockpit windows in one embodiment are polycarbonate, though other lightweight clear plastics may also be used.

Rotor assemblies 101, 102 include rotors that in one embodiment have a 16 inch radius, and are made from carbon fiber composite material, and in an alternative embodiment from carbon fiber composite blades attached to an aluminum hub. In other embodiments, rotors are made from wood blades attached to an aluminum hub, or wood blades attached to a carbon fiber composite hub. The rotors may be a single piece that bolts onto the motor assembly. Rotor assemblies 101 are described further below.

Aircraft 100 includes a wing 104. The wing 104 has downward-angled wingtips 204 at its ends. The downward-angled wingtips provide lateral stability and decrease the drag due to lift on the wing. The particular wingtip shape is established for adequate stability, as will be understood by those skilled in the art.

Vertical lift rotor assemblies 101, 102 are mounted on each side of aircraft 100. In one embodiment, rotor mounting booms 114 (FIG. 2) are secured to the wing 104 via a boom attachment interface 206. In this embodiment, a forward vertical lift rotor assembly 101 and an aft vertical lift rotor assembly 102 are attached to each rotor mounting boom 114. In one embodiment, the boom attachment interface 206 (FIG. 2) allows the rotor mounting boom 114 to be attached to the wing 104 using releasable fasteners, such as screws or bolts, so that the rotor mounting boom may be easily removed from the wing for efficient repair or replacement.

Figure 5A:
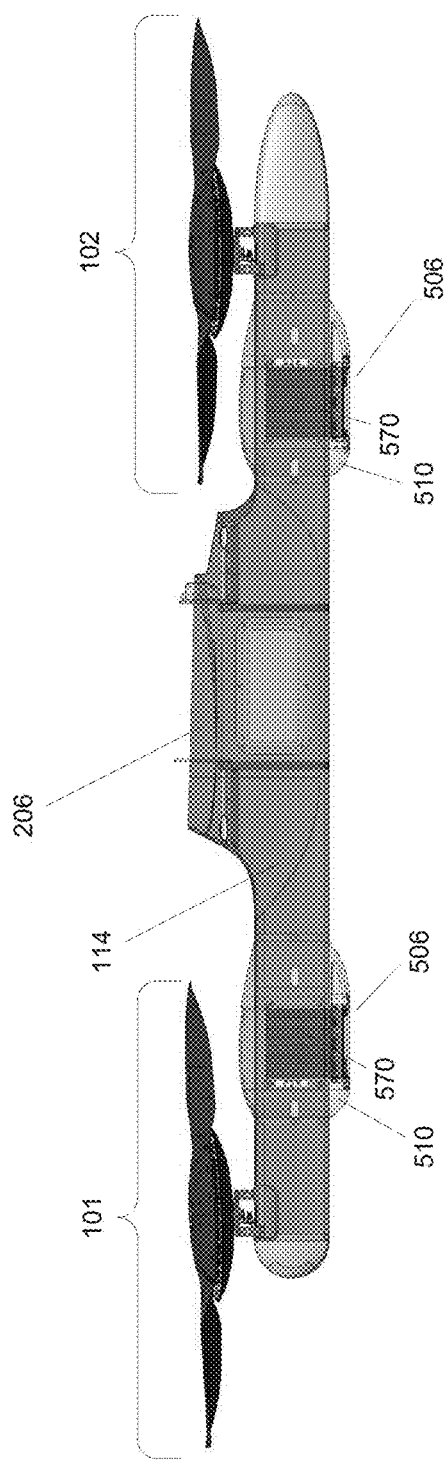
FIG. 5A illustrates a left side view of a rotor mounting boom in accordance with one embodiment.
Figure 5B:
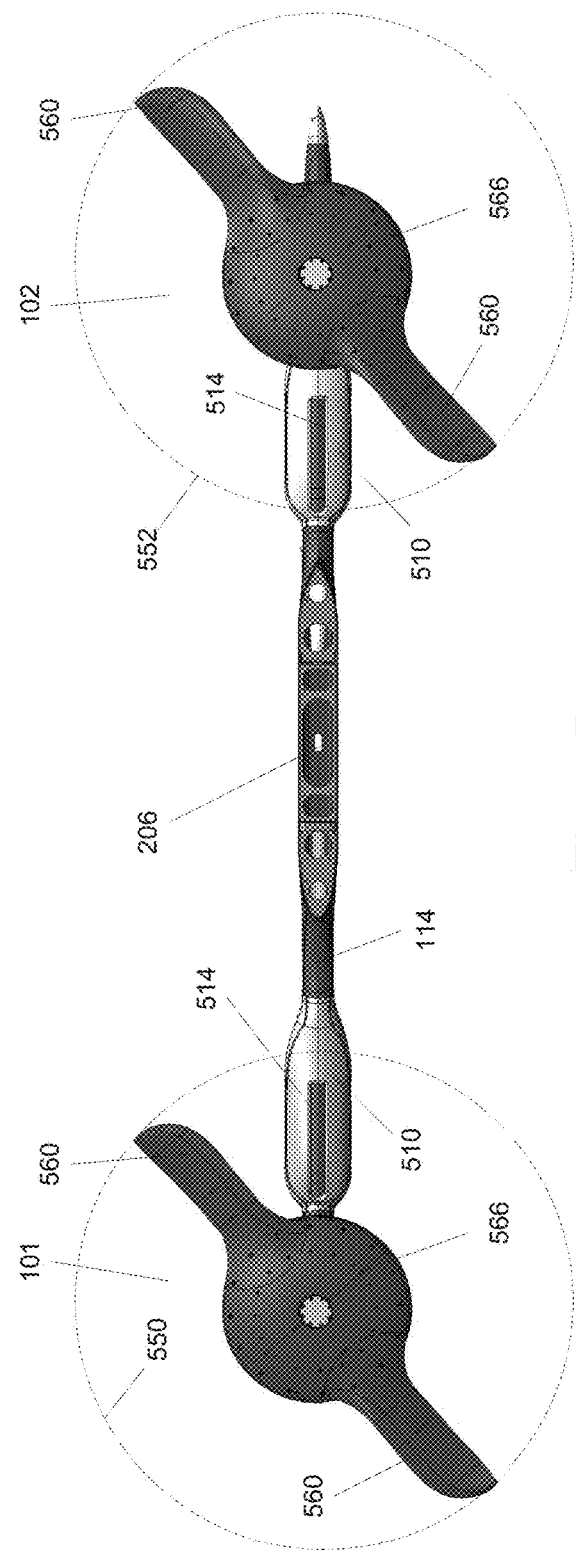
FIG. 5B illustrates a top view of a rotor mounting boom in accordance with one embodiment.
Figure 5E:
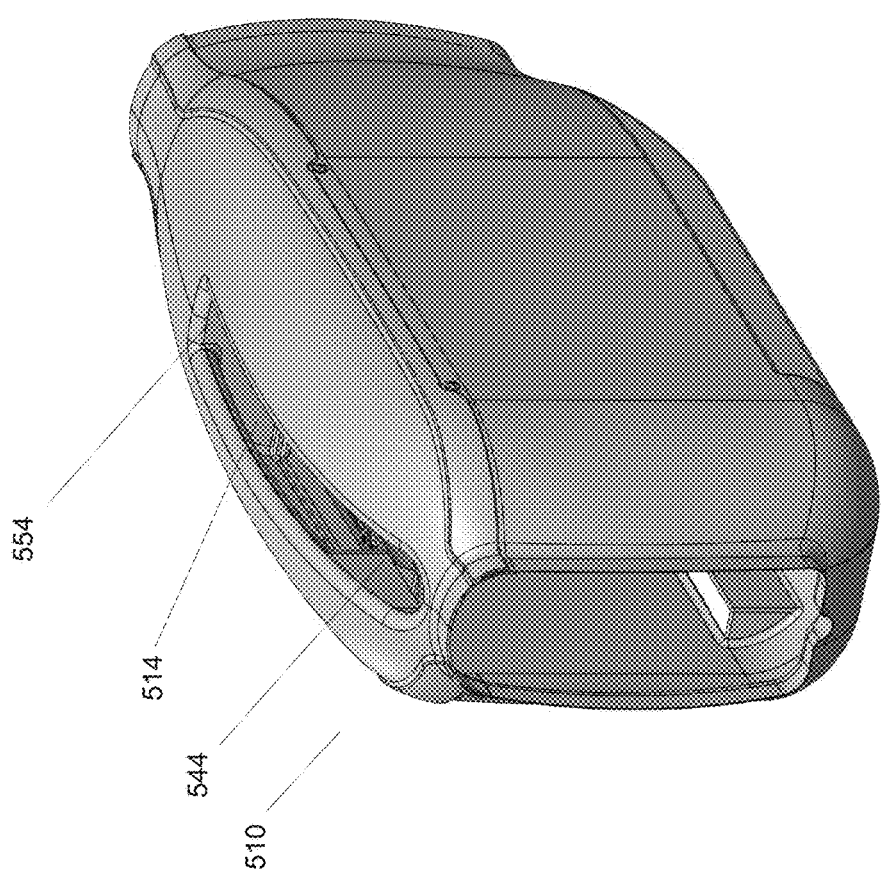
FIG. 5E illustrates a perspective view of an example enclosure for a rotor controller assembly in accordance with one embodiment.

FIG. 5A illustrates a left side view of a rotor mounting boom 114 including vertical lift rotor assemblies 101, 102 and rotor controller assemblies 506 in accordance with one embodiment. FIG. 5B illustrates a view of the top of a rotor mounting boom 114, including an air inlet 514 in accordance with one embodiment. FIG. 5C illustrates a front view of a rotor mounting boom 114. FIG. 5D illustrates a perspective view of a rotor mounting boom 114. FIG. 5E illustrates a perspective view of an example enclosure 510, including air inlet 514. FIG. 5F illustrates a cross-section perspective view of an example enclosure 510. FIG. 5G illustrates a cross-section view of an example enclosure 510. FIG. 5H illustrates the cross-section view of an example enclosure 510 of FIG. 5G with arrows indicating the airflow in and out of the enclosure.

Returning to FIG. 5B, each vertical lift rotor assembly 101, 102 includes a rotor and a motor. The rotor may comprise blades 560 attached to a hub 566, or may be manufactured as a single piece with an integral hub. The blades 560 provide lift by moving air as the rotor rotates. The blades rotate through the rotor paths 550, 552. The hub 566 provides a central structure to which the blades 566 connect, and in some embodiments is made in a shape that envelops the motor. The motor includes a rotating part and a stationary part. In one embodiment the rotating part is concentric to the stationary part, known as a radial flux motor. In this embodiment the stationary part may form the outer ring of the motor, known as an inrunner motor, or the stationary part may form the inner ring of the motor, known as an outrunner motor. In other embodiments the rotating and stationary parts are flat and arranged in opposition to each other, known as an axial flux motor. In some embodiments the motor parts are low-profile so that the entire motor fits within the hub of the rotor, presenting lower resistance to the air flow when flying forward. The rotor is attached to the rotating part of the motor. The stationary part of the motor is attached to the rotor mounting boom 114. In some embodiments the motor is a permanent magnet motor and is controlled by an electronic motor controller. The electronic motor controller sends electrical currents to the motor in a precise sequence to allow the rotor to turn at a desired speed or with a desired torque. In one embodiment, the forward rotor and the aft rotor spin in opposite directions to balance the effect of each rotor's torque while the aircraft is in flight.

Rotor controller assemblies 506 include devices for controlling motor operation for rotor assemblies 101, 102, and may include a computer or other control system. As shown in FIG. 5A, in one embodiment, each rotor mounting boom 114 has two rotor controller assemblies 506 for controlling the vertical lift rotor assemblies 101, 102. In another embodiment, each rotor mounting boom 114 has one rotor controller assembly 506 for controlling both rotors on the rotor mounting boom. Control signals from the rotor controller assemblies 506 are sent to the vertical lift rotor assemblies 101, 102 via a wired or wireless connection. In the example configuration of FIG. 5A, the location of the rotor controller assemblies 506 on the rotor mounting boom 114 has the advantage of minimizing the distance that the control signals must travel between the rotor controller assemblies 506 and the vertical lift rotor assemblies 101, 102, which provides better signal stability and efficiency.

In one embodiment, the rotor controller assembly 506 includes an enclosure 510 that encases the components of the rotor controller assembly. In various embodiments, the rotor controller assemblies 506 include heat exchangers 570, such as a folded-fin heat exchanger to dissipate heat from the other components of the rotor controller assembly. The enclosure 510 may include one or more ventilation openings to allow air to more effectively circulate within the enclosure, allowing for increased performance of the heat exchanger 570. The enclosure 510 may further include airflow channels to direct air within the enclosure. In one embodiment, one or more air inlets 514 and one or more air outlets 516 are disposed on the enclosure 510 to facilitate airflow through the enclosure.

In one embodiment, the rotor controller assembly 506 is positioned on the rotor mounting boom 114 such that the downwash from the rotor causes increased airflow into an air inlet 514. For example, the rotor controller assembly 506 may be positioned below the rotor path 550, 552, as illustrated in FIG. 5B. The enclosure 510 may have multiple openings, for example as illustrated in FIGS. 5E-H, to allow air to flow through the enclosure and increase heat exchanger performance. For example, in the enclosure 510 of FIGS. 5E-F, air may flow into the enclosure via the air inlet 514 and out of the enclosure via the air outlet 516. In other embodiments, the air inlet 514 is located in a different position along the boom than the rotor controller assembly 506, as discussed in more detail below with respect to FIG. 6.

The vertical separation distance between the rotor path and each air inlet 514 is designed to maximize the downwash from the rotor that enters the air inlet 514. In one embodiment, the separation distance is approximately equal to the chord length of the rotor. In one embodiment, the separation distance is approximately equal to one half the chord length of the rotor. The position of the air inlet 514 along the radius of the rotor path 550, 552 is also designed to maximize the downwash from the rotor that enters the air inlet 514. Rotor downwash intensity as a function of the radius of the rotor path is roughly proportional to lift as a function of the radius. The maximum lift is achieved at a distance of two-thirds of the radius from the center of the rotor, so the maximum downwash is present at this location as well. Accordingly, in one embodiment, the air inlet 514 is located below the outer 50% of the rotor path radius so that the part of the rotor generating the most downwash is directly above the air inlet.

The structure of the enclosure 510 may further increase airflow through the enclosure and thus heat exchanger efficiency. Turning to FIG. 5E, the enclosure 510 may be shaped such that an aft portion 554 of the air inlet 514 is raised above a forward portion 544, which increases the air pressure in the area surrounding the air inlet 514, thereby increasing the airflow through the enclosure 510. In one embodiment, channels within the enclosure 510 further direct airflow and improve the efficiency of the heat exchanger 570. In various embodiments, the ventilation openings may be arranged such that air flows through the enclosure 510 during flight even if one or more rotors are deactivated.

FIG. 5G illustrates a cross-section view of an example enclosure 510. The enclosure 510 includes an air inlet 514, an air outlet 516, inlet cowls 520, controller components 524, and heat exchangers 550. The inlet cowl 520 directs airflow (e.g., downwash) into the air inlet 514. The nose cone 522 directs airflow that enters the air inlet 514 to the areas within the enclosure where the heat exchangers 550 are located. The controller components 524 are coupled to the heat exchangers 550 such that heat is transferred from the controller components to the heat exchangers to cool the controller components. The airflow through the enclosure 510 removes heat from the heat exchangers 550 to improve cooling efficiency. In one embodiment, the controller components 524 are coupled to the boom 114, and there are channels within the heat exchangers 550 for allowing air to pass near the controller components. Air that has passed through the enclosure 510 exits the enclosure via the air output 516. FIG. 5H illustrates the cross-section view of the example enclosure 510 of FIG. 5G with dashed arrows indicating the airflow into the air inlet 514, through the enclosure 510, and out of the air outlet 516.

Figure 6:
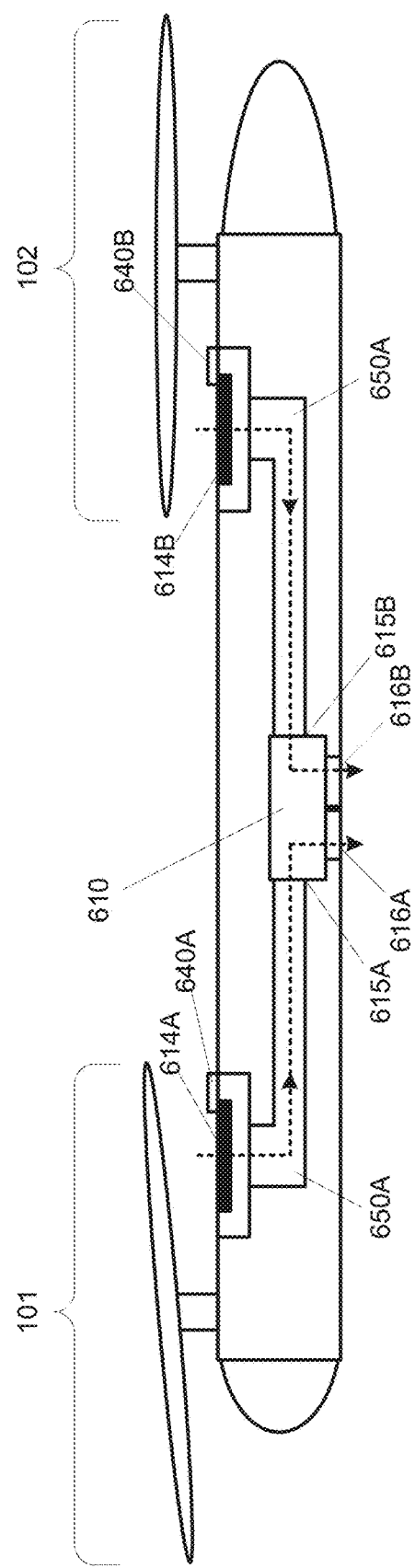
FIG. 6 illustrates a side view rotor mounting boom in accordance with a second embodiment.

FIG. 6 illustrates a side view rotor mounting boom in accordance with a second embodiment. The mounting boom of FIG. 6 includes vertical lift assemblies 101, 102, and a controller enclosure 610. The controller enclosure 610 encases a controller assembly similar to the controller assemblies 506. The controller assembly of FIG. 6 provides control signals to vertical lift rotor assemblies 101, 102 via wired or wireless connections. The controller assembly of the mounting boom of FIG. 6 may include a heat exchanger such as a folded-fin heat exchanger. The controller enclosure 610 includes air channels similar to the controller enclosure 510 to allow air to pass through the enclosure to cool the components of the controller assembly as discussed above. The airflow is indicated by the dashed line of FIG. 6.

The rotor mounting boom of FIG. 6 includes air inlets 614A,B positioned below the rotor path similar to air inlets 514. Each air inlet 614 is coupled to a duct 650A,B such that airflow flows into the air inlet 614 and continues into the duct 650. The duct 650 is disposed on or inside the mounting boom, and channels airflow toward the controller enclosure 610. The controller enclosure 610 includes one or more duct interfaces 615 that allow the airflow to travel from the duct 650 into the controller enclosure to cool the controller components. In one embodiment, the controller enclosure 610 includes one or more air outlets 616A,B through which the airflow exits the enclosure. In another embodiment, the airflow exits the controller enclosure 610 via one or more ducts that channel air to an air outlet. Similar to the enclosure 510, the air inlet 614 may include structural components that increase airflow into the air inlet. For example, raised areas 640 shown in FIG. 6 may be included in the structure of the air inlet 614 to increase air pressure around the inlet, which increases airflow into the inlet.

In various embodiments, the arrangement of the components described with respect to FIG. 6 may be different than the arrangement shown in FIG. 6. For example, in one embodiment, the rotor mounting boom includes one or more ducts 650 that channel air to two or more controller assemblies or controller enclosures 610. In another embodiment, the rotor mounting boom includes one air inlet 614 for providing airflow to one or more controller assemblies. In yet another embodiment, the vertical lift rotor assemblies 101, 102 may be oriented differently, for example on the bottom of the rotor mounting booms, and rather than rotor downwash increasing airflow through into the air inlet 614, the rotors may increase airflow by drawing air through an air outlet 614 disposed near the rotor path.

Figure 7:
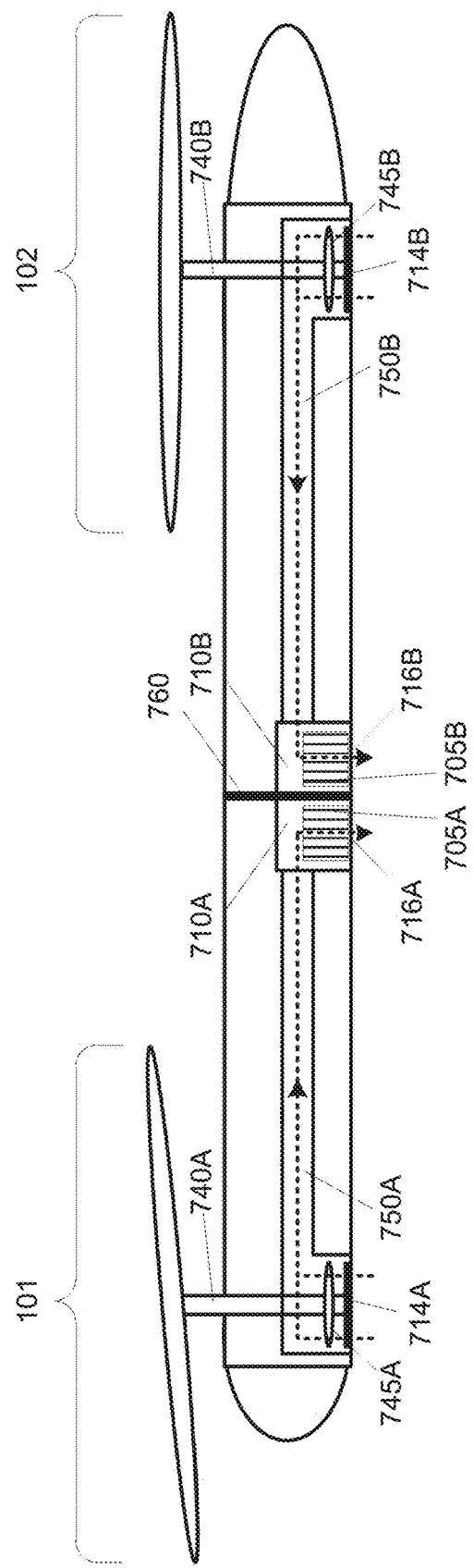
FIG. 7 illustrates a side view rotor mounting boom in accordance with a third embodiment.

FIG. 7 illustrates a side view rotor mounting boom in accordance with a third embodiment. The mounting boom of FIG. 7 includes vertical lift assemblies 101, 102, a forward controller enclosure 710A, and an aft controller enclosure 710B. The controller enclosures 710 encase controller assemblies similar to the controller assemblies 506. The controller enclosures 710 are separated by a barrier 760. The controller assemblies of FIG. 7 provide control signals to vertical lift rotor assemblies 101, 102 via wired or wireless connections. In one embodiment, the connections are made using high voltage cables. The controller assemblies of FIG. 7 may include one or more heat exchangers 705A,B such as folded-fin heat exchangers. The controller enclosures 710 include air channels similar to the controller enclosure 510 to allow air to pass through the enclosure to cool the components of the controller assembly as discussed above. The airflow is indicated by the dashed lines of FIG. 7.

The rotor mounting boom of FIG. 7 includes drive shafts 740A and 740B that are coupled to the vertical lift assemblies 101, 102, respectively such that the drive shafts rotate as the rotors of the vertical lift assemblies rotate. The drive shafts 740 are coupled to auxiliary fans 745A,B such that rotation of the drive shafts turns the auxiliary fans. The auxiliary fans 745 are positioned near air inlets 714A,B such that rotation of the auxiliary fans 745 draws air into the air inlets. The air inlets 714 are coupled to ducts 750 such that airflow flowing into the air inlets 714 continues into the ducts 750A,B. The ducts 750 are disposed on or inside the mounting boom, and channel airflow toward the controller enclosures 710. Each controller enclosure 710 is coupled to a duct 750 such that the airflow travels from the duct 750 into the controller enclosure to cool the controller components. In one embodiment, the controller enclosure 710 includes one or more air outlets 716A,B through which the airflow exits the enclosure. In another embodiment, the airflow exits the controller enclosure 710 via one or more ducts that channel air to an air outlet. Similar to the enclosure 510, the air inlet 714 may include structural components that increase airflow into the air inlet.

Figure 8:
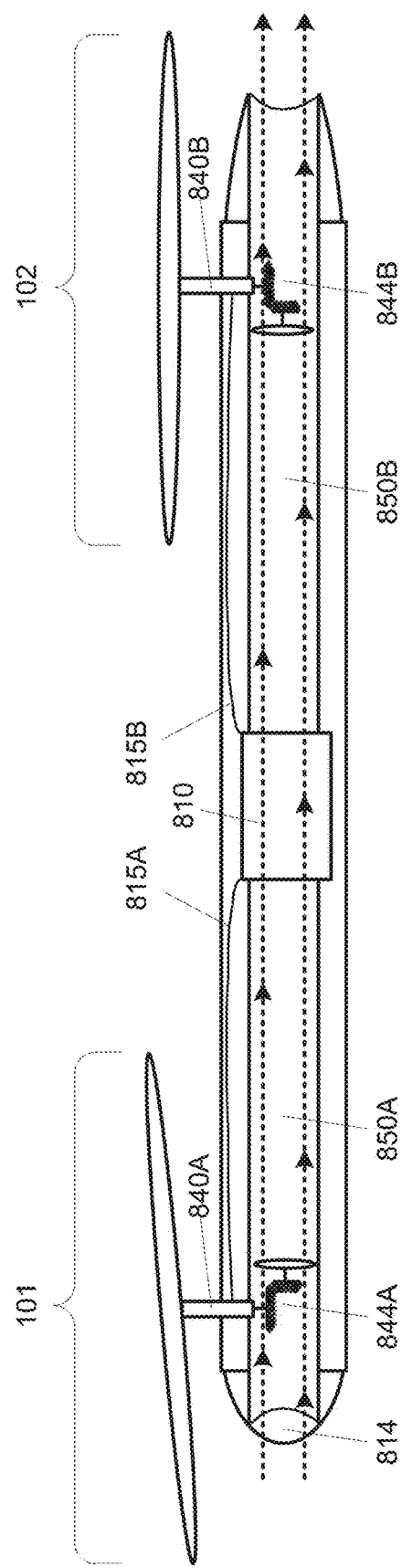
FIG. 8 illustrates a side view rotor mounting boom in accordance with a fourth embodiment.

FIG. 8 illustrates a side view rotor mounting boom in accordance with a fourth embodiment. The mounting boom of FIG. 8 includes vertical lift assemblies 101, 102, and a controller enclosure 810. The controller enclosure 810 encases controller assemblies similar to the controller assemblies 506. The controller assemblies of FIG. 8 provide control signals to vertical lift rotor assemblies 101, 102 via wired or wireless connections. In one embodiment, the connections are made using high voltage cables 815A and 815B. The controller assemblies of FIG. 7 may include one or more heat exchangers such as folded-fin heat exchangers. The controller enclosure 810 includes air channels similar to the controller enclosure 510 to allow air to pass through the enclosure to cool the components of the controller assembly as discussed above.

The rotor mounting boom of FIG. 8 includes an air inlet 814 at a forward end of the boom. The air inlet 814 is coupled to a forward duct 850A such that airflow flowing into the air inlet 814 continues into the forward duct 850A. The forward duct 850A is coupled to the controller enclosure 810 such that airflow through the forward duct passes through the controller enclosure. The enclosure 810 is coupled to an aft duct 850B such that air passing through the controller enclosure passes through the aft duct 850B. The aft duct 850B is coupled to an air outlet 816 such that the airflow through the aft duct 850B passes through the air outlet 816 and out of the boom. The airflow through the boom is indicated by the dashed lines of FIG. 8.

The rotor mounting boom of FIG. 8 includes drive shafts 840A and 840B that are coupled to the vertical lift assemblies 101, 102, respectively such that the drive shafts rotate as the rotors of the vertical lift assemblies rotate. The drive shafts 840 are coupled to auxiliary fans 845 such that rotation of the drive shafts turns the auxiliary fans. The axis of rotation of each auxiliary fan 845 is positioned at substantially a ninety degree angle relative to the axis of rotation of the corresponding drive shaft 840 and substantially parallel to the ducts 850 such that the auxiliary fans 845 move air through the ducts 850. The drive shafts are coupled to the auxiliary fans 845 via gear assemblies 844A,B. In one embodiment, the gear assemblies 844 are beveled gears with shafts ninety degrees apart such that the rotation of the drive shafts 840 is transmitted to the auxiliary fans 845.

Figure 9:
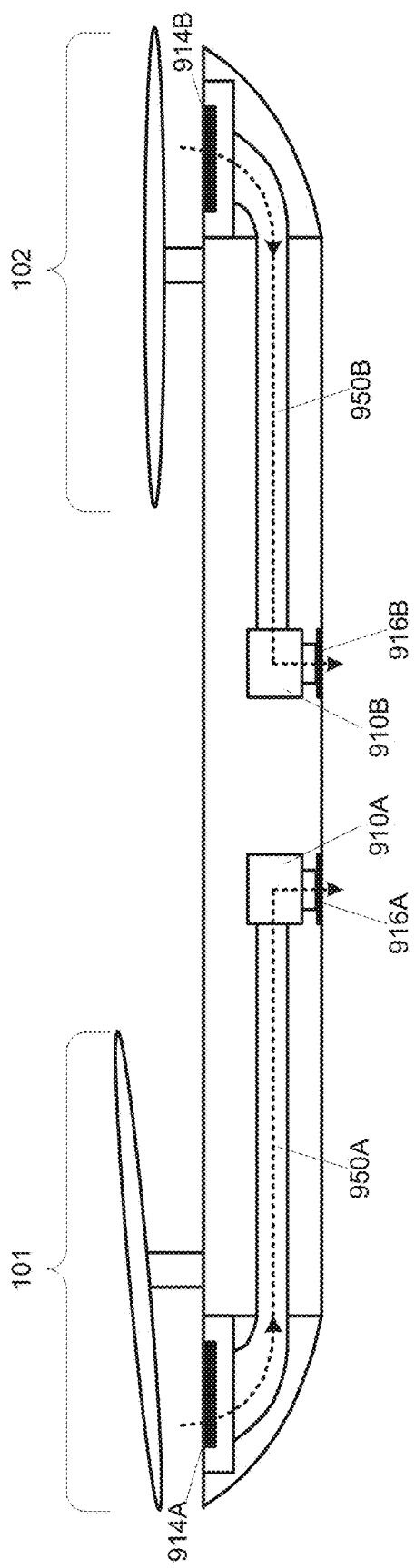
FIG. 9 illustrates a side view rotor mounting boom in accordance with a fifth embodiment.

FIG. 9 illustrates a side view rotor mounting boom in accordance with a fifth embodiment. The mounting boom of FIG. 9 includes vertical lift assemblies 101, 102, forward controller enclosure 910A, and aft controller enclosure 910B. Each controller enclosure 910 encases a controller assembly similar to the controller assemblies 506. The controller assemblies of FIG. 9 provide control signals to vertical lift rotor assemblies 101, 102 via wired or wireless connections. The controller assemblies of the mounting boom of FIG. 9 may include heat exchangers such as a folded-fin heat exchanger. The controller enclosures 910 includes air channels similar to the controller enclosure 510 to allow air to pass through the enclosure to cool the components of the controller assembly as discussed above. The airflow is indicated by the dashed lines of FIG. 9.

The rotor mounting boom of FIG. 9 includes air inlets 914A,B positioned below the rotor path similar to air inlets 514. Each air inlet 914 is coupled to a duct 950A,B such that airflow flows into the air inlet 914 and continues into the duct 950. The duct 950 is disposed on or inside the mounting boom, and channels airflow toward the controller enclosures 910. The air inlets 914 are coupled to ducts 950 such that airflow flowing into the air inlets 914 continues into the ducts 950A,B. In one embodiment, each controller enclosure 910 includes one or more air outlets through which the airflow exits the enclosure. In another embodiment, the airflow exits the controller enclosure 910 via one or more ducts 915 that channel air to an air outlet 916A,B. Similar to the enclosure 510, the air inlet 914 may include structural components that increase airflow into the air inlet.

As noted, aircraft 100 includes multiple rotor mounting booms 114 and rotor assemblies 101, 102 per side. The vertical lift rotors generate thrust that is independent of the thrust generated by the forward flight propellers 103 during horizontal cruise. The vertical lift rotors provide enough thrust to lift the aircraft off the ground and maintain control. In one embodiment, each rotor generates more, e.g., 40% more, thrust than is needed to hover, to maintain control in all portions of the flight envelope. The rotors are optimized by selecting the diameter, blade chord, and blade incidence distributions to provide the needed thrust with minimum consumed power at hover and low speed flight conditions. In various embodiments, half of the rotors rotate in one direction, and the other half rotate in the opposite direction to balance the reaction torque on the aircraft. In some embodiments, rotors mounted on the same rotor mounting boom have opposite directions of rotation. In other embodiments rotors mounted on the same rotor mounting boom have the same direction of rotation. In some embodiments, the rotors may be individually tuned to account for different interactions between the rotors, or between the airframe and the rotors. In such embodiments the tuning includes adjusting the incidence or chord distributions on the blades to account for favorable or adverse interactions and achieve the necessary performance from the rotor. In the embodiment illustrated in FIG. 1, three forward vertical lift rotor assemblies 101 and three aft vertical lift rotor assemblies 102 per side are shown. In alternative embodiments more or fewer vertical lift rotors provide the vertical lift and control. When at least two rotors per side are present, the ability to produce a vertical force with equilibrium about the center of gravity is retained even when one rotor fails. This is achieved by decreasing the thrust on the opposite quadrant to the failed rotor. When three rotors per side are present, control about all three axes, or directions of flight, is available. As the number of rotors per side increases, the loss of any one rotor results in a decreasing overall loss of vertical thrust. However, with each extra pair of rotors there is increasing complexity and probability that a failure would result, as well as increased cost and weight.

In one embodiment, the forward vertical lift rotor assemblies 101 located in front of the CG and the aft vertical lift rotor assemblies are located behind the CG. In this manner, the center of lift of the rotors in hover is co-located with the center of gravity of the aircraft 100. This arrangement permits a variation of longitudinal or lateral positioning of the payload in the fuselage 107. A flight computer modifies the thrust produced by each vertical lift rotor independently, providing a balanced vertical lift or, alternatively, unbalanced lift to provide control.

In some embodiments, the rotor orientation provides lateral and longitudinal control of the aircraft without requiring a change of attitude. Because rotor assemblies 101, 102 are each mounted to cant outward, inward, forward, or back, a proper combination of rotor thrusts results in a net force in the horizontal plane, as well as the needed vertical lift force. This is helpful when maneuvering near the ground, for example. In addition, in the case of a rotor failure in which a blade becomes damaged or separated, the different cant angles make it less likely that another rotor will be damaged, thus making the design more failure tolerant. The orientations are also chosen to minimize disturbances to the flow when the aircraft is cruising. In some embodiments, the orientation of the rotors is varied forward, backward, left, and right, enabling the aircraft to maneuver in any direction without changing attitude. In other embodiments, the orientation is varied only left and right, minimizing the disturbance to the flow during cruise, but meaning that the aircraft can only maneuver side-to-side, not forward and backward, without changing attitude.

Forward flight propellers 103 provide the thrust for transition to forward flight, climb, descent, and cruise. In one embodiment two or more forward thrust propellers 103 are mounted along the span of the horizontal stabilizer 105. In alternative embodiments, a single forward thrust propeller is mounted on the aft portion of the fuselage 107 at the center of the span. In other embodiments, one or more propellers are mounted to the front of the wing 104 or propulsion booms as tractor propellers. The propellers can be rotated in opposite directions so that the torque required to turn them does not produce a net torque on the airplane. Also, the thrust of the two propellers can be varied differentially to provide a yaw control moment. Positioning on the wing results in less inflow disturbance to the propellers. Use of a single propeller on the fuselage permits fewer components and less weight, but with a different-sized motor and with the inflow including disturbances from the fuselage. In one embodiment, the forward propellers are fixed-pitch. The chord and incidence distributions are optimized to provide adequate thrust for acceleration and climbing both when the vehicle is moving slowly and supported in the air by the thrust of the rotors and when the aircraft is moving quickly and is fully supported by the lift of the wings. Additionally, the chord and incidence distributions are selected to provide efficient thrust at the cruising speed of the aircraft. In other embodiments the forward propellers utilize a variable pitch mechanism which allows the incidence of each blade to be adjusted depending on the flight condition.

The vertical lift rotors and the forward propellers may be driven by electric motors that are powered by a power system. In one embodiment the power system includes a battery that is attached to one motor controller for each motor. In one embodiment the battery comprises one or more modules located within the fuselage of the aircraft. In other embodiments the battery modules are located in the propulsion booms. The battery provides a DC voltage and current that the motor controllers turn into the AC signals that make the motors spin. In some embodiments the battery comprises lithium polymer cells connected together in parallel and in series to generate the needed voltage and current. Alternatively, cells of other chemistry may be used. In one embodiment the cells are connected into 93 cell series strings, and 6 of these strings are connected in parallel. In other embodiments, the cells are connected with more or fewer cells in series and more or fewer cells in parallel. In alternative embodiments, the rotors and propellers are powered by a power system that includes a hybrid-electric system with a small hydrocarbon-based fuel engine and a smaller battery. The hydrocarbon engine provides extended range in forward flight and can recharge the battery system.

As noted, the use of multiple independently controlled rotors provides a redundant lift system. For example, a system that includes six or more rotors permits hover and vertical ascent/descent with safe operation without forward airspeed, even if one or several individual components fail.

Figure 10A:
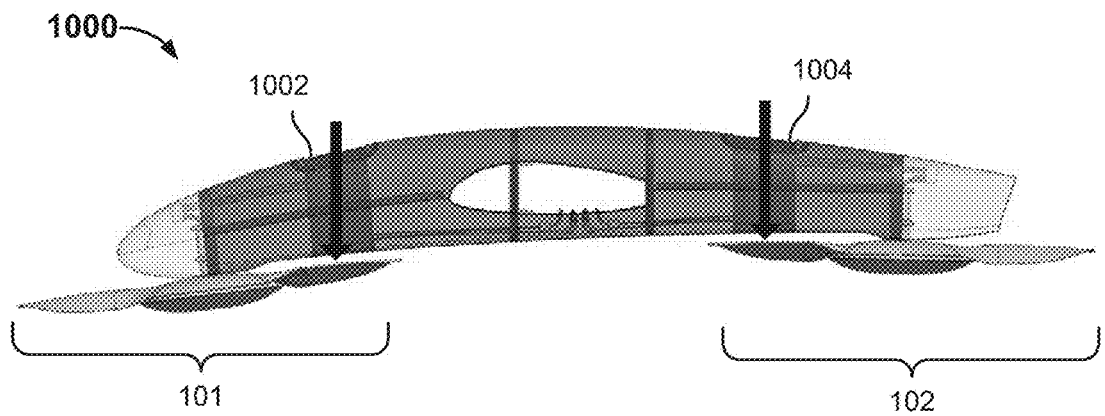
FIG. 10A illustrates a side view rotor mounting boom in accordance with one embodiment.

FIG. 10A illustrates a side view rotor mounting boom in accordance with one embodiment. The mounting boom 1000 of FIG. 10A includes vertical lift assemblies 101, 102 mounted to the underside of the mounting boom. In various embodiments, the vertical lift assemblies 101, 102 pull air into and/or through the mounting boom of FIG. 10A, to provide cooling as disclosed herein. In the example shown, cooling air is pulled through the mounting boom 1000 by the vertical lift assemblies 101, 102, respectively, via inlets 1002, 1004 at the top of the boom 1000 and out through the bottom of boom 1000, as indicated by the large downward arrows originating at inlets 1002, 1004.

Figure 10B:
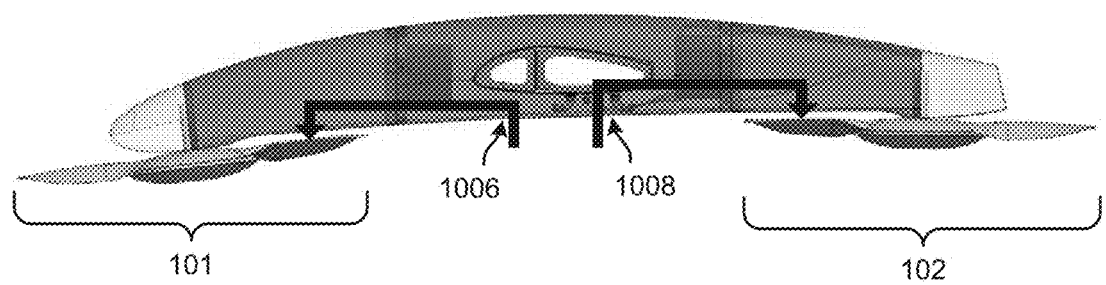
FIG. 10B illustrates a side view rotor mounting boom in accordance with one embodiment.

FIG. 10B illustrates a side view rotor mounting boom in accordance with one embodiment. The mounting boom of FIG. 10B includes vertical lift assemblies 101, 102 mounted to the underside of the mounting boom. In various embodiments, the vertical lift assemblies 101, 102 pull air into and/or through the mounting boom of FIG. 10A, to provide cooling as disclosed herein. In the example shown, the vertical lift assemblies 101, 102 pull air into the boom assembly of FIG. 10B via inlets 1006, 1008 on the underside of the boom assembly of FIG. 10B, as indicated by the arrows originating at inlets 1006, 1008 and ending at outlets located above the vertical lift assemblies 101, 102.

Figure 11:
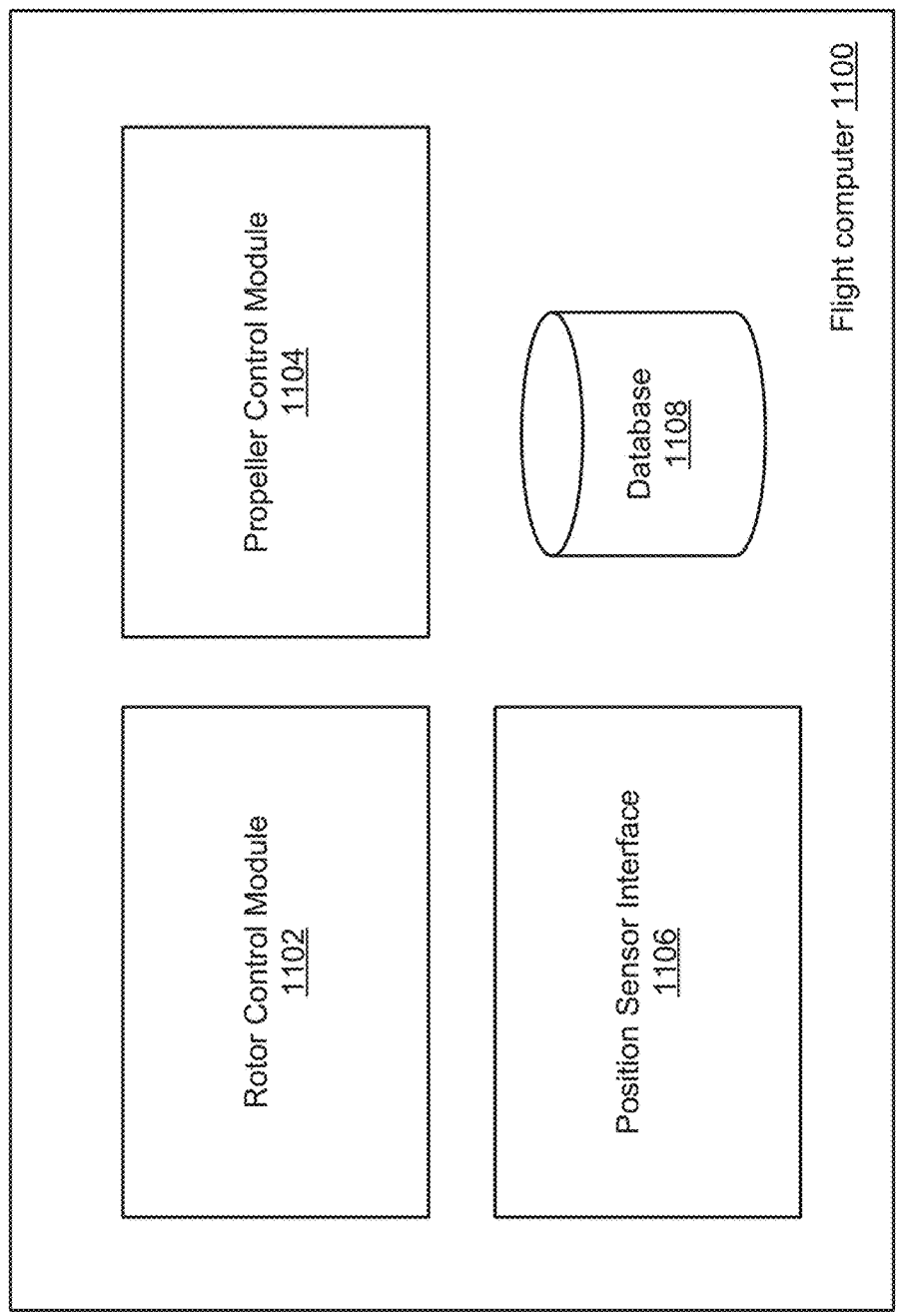
FIG. 11 is a block diagram of a flight computer 1100 in accordance with one embodiment.

FIG. 11 is a block diagram of a flight computer 1100 in accordance with one embodiment. Flight computer 1100 is located on board aircraft 100, typically within the fuselage 107. Flight computer 1100 includes a rotor control module 1102, propeller control module 1104, position sensor interface 1106, and a database 1108. Position sensor interface 1106 is communicatively coupled to the aircraft's instruments and receives sensor data in one embodiment that includes the aircraft's position, altitude, attitude and velocity. Rotor control module 1102 receives data from position sensor interface 1106 and from control inputs in the cockpit and determines how much thrust is required from each of the vertical lift rotor assemblies 101, 102 to achieve the commanded response. Rotor control module 1102 commands each rotor assembly 101, 102 independently to produce the determined required thrust. In the event of a rotor failure, rotor control module 1102 adjusts the thrust requirements to compensate for the lost rotor. Propeller control module 1104 receives data from position sensor interface 1106 and from control inputs in the cockpit, determines how much forward thrust is required from each of the propellers 103, and commands the propellers to produce the required thrust. Database 1108 includes programmed trajectories for ascent and descent to be used during transition, and may also include additional features used for navigation and control of aircraft 100 as will be appreciated by those of skill in the art. Flight computer 1100 also includes other components and modules to perform navigation and flight operations and which are known to those of skill in the art, but not germane to this description.

Landing gear is provided with wheels to permit the aircraft to move while on the ground. The landing gear may retract into the fuselage 107 while the aircraft is in flight. In other embodiments the landing gear is a skid and has no wheels, since the aircraft is capable of takeoff and landing without forward movement. In some embodiments, some or all of the wheels are fitted with electric motors that allow the wheels to be driven. Such motors allow the vehicle to be self-propelled while on the ground.

In addition to the embodiments specifically described above, those of skill in the art will appreciate that the invention may additionally be practiced in other embodiments. For example, in an alternative embodiment, aircraft 100 is designed to accommodate two or more occupants. In such an embodiment, the wingspan is larger, the rotors have a larger diameter, and the fuselage 107 is wider. In an alternative embodiment, aircraft 100 is an unmanned vehicle that is capable of flight without a pilot or passengers. Embodiments without passengers have additional control systems that provide directional control inputs in place of a pilot, either through a ground link or through a predetermined flight path trajectory.

Although this description has been provided in the context of specific embodiments, those of skill in the art will appreciate that many alternative embodiments may be inferred from the teaching provided. Furthermore, within this written description, the particular naming of the components, capitalization of terms, the attributes, data structures, or any other structural or programming aspect is not mandatory or significant unless otherwise noted, and the mechanisms that implement the described invention or its features may have different names, formats, or protocols. Further, some aspects of the system including components of the flight computer 700 may be implemented via a combination of hardware and software or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A boom assembly for a personal aircraft, the boom assembly comprising:
   a boom attachment interface to mount the boom assembly to a wing of the personal aircraft via;
   a vertical lift rotor attachment interface to mount a vertical lift rotor to the boom assembly;
   an air inlet positioned on the boom such that airflow generated by the vertical lift rotor is directed through the air inlet; and
   a rotor controller enclosure internal to the boom assembly, the rotor controller enclosure comprising a location to install a rotor controller to control the vertical lift rotor, wherein the rotor controller enclosure is in fluid communication with the air inlet and an air outlet for allowing air to flow through the rotor controller enclosure.

2. The boom assembly of claim 1, wherein the vertical lift rotor attachment interface comprises a first vertical lift fan rotor attachment interface located forward of the boom attachment interface and the boom assembly further includes a second vertical lift rotor attachment interface located aft of the boom attachment interface.

3. The boom assembly of claim 2, wherein the boom assembly further includes a second controller enclosure associated with the second vertical lift rotor attachment interface.

4. The boom assembly of claim 3, wherein the air inlet comprises a first air inlet and the air outlet comprises a first air outlet; the boom assembly further includes a second air inlet and a second air outlet; and the second controller enclosure is in fluid communication with the second air inlet and the second air outlet.

5. The boom assembly of claim 1, wherein the controller enclosure further includes a heat exchanger coupled to the rotor controller, the heat exchanger adapted to dissipate heat from the rotor controller.

6. The boom assembly of claim 5, wherein the heat exchanger is a folded-fin heat exchanger.

7. The boom assembly of claim 1, wherein the air inlet is positioned below a rotor path of the vertical lift rotor a distance substantially equal to one chord length of a blade of the vertical lift rotor.

8. The boom assembly of claim 1, wherein the air inlet is positioned below a rotor path of the vertical lift rotor a distance substantially equal to one half a chord length of a blade of the vertical lift rotor.

9. The boom assembly of claim 1, wherein the air inlet is positioned along the boom at a position that is below the outer 50% of a rotor path of the rotor.

10. The boom assembly of claim 1, wherein the controller enclosure comprises a raised area aft of the air inlet to increase the air pressure around the air inlet.

11. The boom assembly of claim 1, wherein the controller enclosure comprises an inlet cowl to direct air into the air inlet.

12. The boom assembly of claim 1, wherein the controller enclosure assembly further comprises a nose cone to direct airflow inside the controller enclosure.

13. The boom assembly of claim 1, wherein the controller enclosure assembly further comprises channels for directing airflow inside the controller enclosure.

14. The boom assembly of claim 1, wherein a duct is disposed between the air inlet and the controller enclosure, the duct capable of directing air from the air inlet to the controller enclosure.

15. The boom assembly of claim 1, further comprising an auxiliary fan coupled to a vertical lift rotor assembly that includes the vertical lift rotor such that the vertical lift rotor assembly drives the auxiliary fan, wherein the auxiliary fan directs airflow through the air inlet.

16. The boom assembly of claim 15, wherein the auxiliary fan is driven by a drive shaft coupled to the vertical lift rotor assembly and the auxiliary fan.

17. The boom assembly of claim 16, further comprising a gear assembly disposed between the drive shaft and the auxiliary fan such that an axis of rotation of the auxiliary fan is not parallel to an axis of rotation of the drive shaft.

* * * * *